US00RE41173E

(19) United States
(12) Reissued Patent
Baggs

(10) Patent Number: US RE41,173 E
(45) Date of Reissued Patent: Mar. 30, 2010

(54) SYSTEM FOR USE IN CONTROLLING A HYDROCARBON PRODUCTION WELL

(75) Inventor: Christopher David Baggs, Weston-Super-Mare (GB)

(73) Assignee: Vetco Gray Controls Limited, Nailsea, Bristol (GB)

(21) Appl. No.: 11/805,864

(22) Filed: May 24, 2007

Related U.S. Patent Documents

Reissue of:
(64) Patent No.: 7,148,812
Issued: Dec. 12, 2006
Appl. No.: 10/726,674
Filed: Dec. 3, 2003

(51) Int. Cl.
*G01V 3/00* (2006.01)

(52) U.S. Cl. ..... 340/853.7; 340/853.1; 340/854.7
(58) Field of Classification Search ..... 340/853.1, 340/353.7, 854.7
See application file for complete search history.

(56) References Cited

U.S. PATENT DOCUMENTS

| | | | | |
|---|---|---|---|---|
| 3,516,492 | A | 6/1970 | Petersen | |
| 4,701,756 | A | 10/1987 | Burr | |
| 5,959,547 | A | 9/1999 | Tubel et al. | |
| 6,229,453 | B1 | 5/2001 | Gardner et al. | |
| 6,420,976 | B1 | 7/2002 | Baggs et al. | |
| 6,816,082 | B1 | 11/2004 | Laborde | |
| 2004/0159430 | A1 | 8/2004 | Baggs | |
| 2004/0262008 | A1 * | 12/2004 | Deans et al. | 166/339 |
| 2005/0035875 | A1 * | 2/2005 | Hall et al. | 340/853.1 |

OTHER PUBLICATIONS

Letter dated Dec. 16, 2008, from FMC Technologies to GE–Vetco regarding Vetco GB Patent No. GB2396086C and foreign equivalents, with Exhibits A–F.
Minutes of Meeting of FMC presentation on Aug. 22–23, 2001, pp. 1–9.
Production Operations "Advancing Subsea Fiber–Optic Use", Oct. 1996 JBT, pp. 936–937.

* cited by examiner

*Primary Examiner*—Timothy Edwards, Jr.
(74) *Attorney, Agent, or Firm*—Bracewell & Giuliani LLP

(57) ABSTRACT

A system for use in controlling a hydrocarbon production well has a: computer at a control location remote from a well tree of the well. A processor at the well tree applies control signals to and receives signals from devices of well tree. The processor also receives further signals associated with the operation of the well. A bi-directional communication link extends between the remote computer and the well tree processor. The well tree further has a communications router coupled with the processor and receiver, for multiplexing the signals from devices at the well head and the further signals on to the bi-directional link.

50 Claims, 5 Drawing Sheets

SYSTEM FOR USE IN CONTROLLING A HYDROCARBON PRODUCTION WELL

Matter enclosed in heavy brackets [ ] appears in the original patent but forms no part of this reissue specification; matter printed in italics indicates the additions made by reissue.

CROSS-REFERENCE TO RELATED APPLICATION

This application claims the benefit of United Kingdom Patent Application No. 0228203.6, filed on Dec. 3, 2002, which hereby is incorporated by reference in its entirety.

TECHNICAL FIELD OF THE INVENTION

The present invention relates to a system for use in controlling a hydrocarbon production well.

BACKGROUND OF THE INVENTION

In the subsea fluid extraction industry, communication is required between a control centre and well heads located on the seabed. Traditionally, the control centre is located on a platform or vessel in relatively close proximity to the well complex. In some cases, the control centre is located on land, where the distance from the control centre to the well heads can be much greater and could be typically 200 km. High capacity communication systems, typically involving optical fibres, allow the possibility of much higher data rates between the subsea and surface facilities, which further enables methods of connecting subsea data sources (e.g. sensors), particularly those generating large quantities of data such as microseismic sensors and TV cameras.

A conventional approach is to use a standard subsea bus at the well head ends of a data transmission system to connect such various subsea data sources. This means that any other party providing equipment to the system has to interface with the bus and conform to its protocol, data rates and bus standards. Since different manufacturers have standard equipment with interfaces to a multiplicity of protocols and data rates, substantial costs are involved in adapting these interfaces to suit the standard bus. Furthermore, since this data is time multiplexed on the bus, the data rates are also somewhat limited such that some desirable, high bandwidth, data transmissions, such as digital video signals, cannot be economically transmitted.

FIG. 1 shows a conventional system for the communication of data between subsea well trees and a surface facility. Mounted on each of a number of subsea well trees (not shown) is a subsea electronics module (SEM) 1 including a SEM processor 2, which handles at a port 3 data from conventional tree sensors such as pressure and temperature and at a port 4 data for control of devices such as valves and fluid control chokes, there being a port 5 for a standard interface for data from other subsea data sources. The SEM processor 2 communicates bi-directionally with a surface facility computer system 6 (on shore or on a platform for example) via a modem 7 housed in the SEM 1, a communication link 8 and a modem 9 housed in a surface modem unit (SMU) 10 at the surface facility. The communication link 8 enables communication with the SEMs of other well trees and at some or all of the well trees there is system duplication to improve system availability—thus in FIG. 1 there are shown two SEMs (SEM A1 and SEM B1) for a particular well tree, SEM A2 and SEM B2 representing duplicate SEMs for another tree.

When the surface computer 6 is located at a considerable distance, such as, typically, 200 km from the well complex, a fibre optic link is used as link 8 to transmit data between the or each SEM at a well tree to the surface computer 6. Nevertheless, the data from other sources at port 5 needs to be adapted to the protocol, data rates and other standards used for the communication of control information and sensor information.

SUMMARY OF THE INVENTION

According to the present invention, there is provided a system for use in controlling a hydrocarbon production well, comprising computing means at a control location remote from a well tree of the well. The system also has a well tree means has a processing means for applying control signals to and receiving signals from devices of the well tree. The well tree means includes means for receiving further signals associated with the operation of the well. A bi-directional communication link exists between said computing means and said well tree means.

The well tree means further comprises a communications router coupled with said processing means and said receiving means, for multiplexing said signals from devices at the well head and said further signals on to said bi-directional link. The bi-directional link could comprise a fibre optics link.

There could be a plurality of such well tree means at respective well trees, there being a distribution means between said bi-directional link and the well tree means for distributing control signals to said well tree means and receiving multiplexed signals from said well tree means.

The signals from devices at the well head and further signals could have different protocols and different data speeds. The further signals could include video signals.

The present invention also comprises a combination of a system according to the invention providing a first communication channel, and a further such system, providing a second communication channel for use if the first channel fails.

BRIEF DESCRIPTION OF THE DRAWINGS

The present invention will now be described, by way of example, with reference to the accompanying drawings, in which.

DETAIL DESCRIPTION OF THE PREFERRED EMBODIMENT

Figure 1:
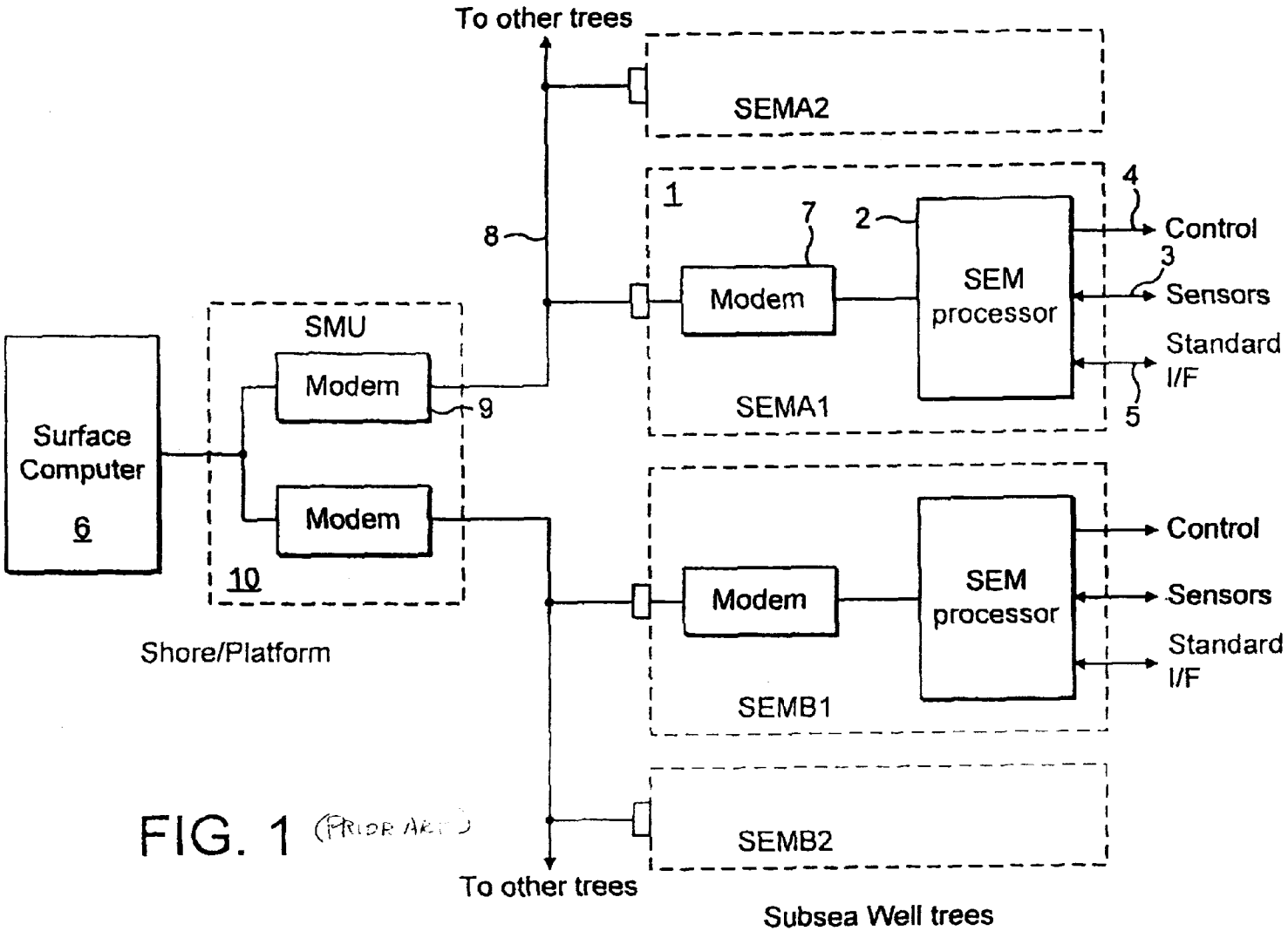
FIG. 1 (PRIOR ART)
FIG. 1 is a diagram of a prior art form of system for use in controlling a hydrocarbon production well.
Figure 2:
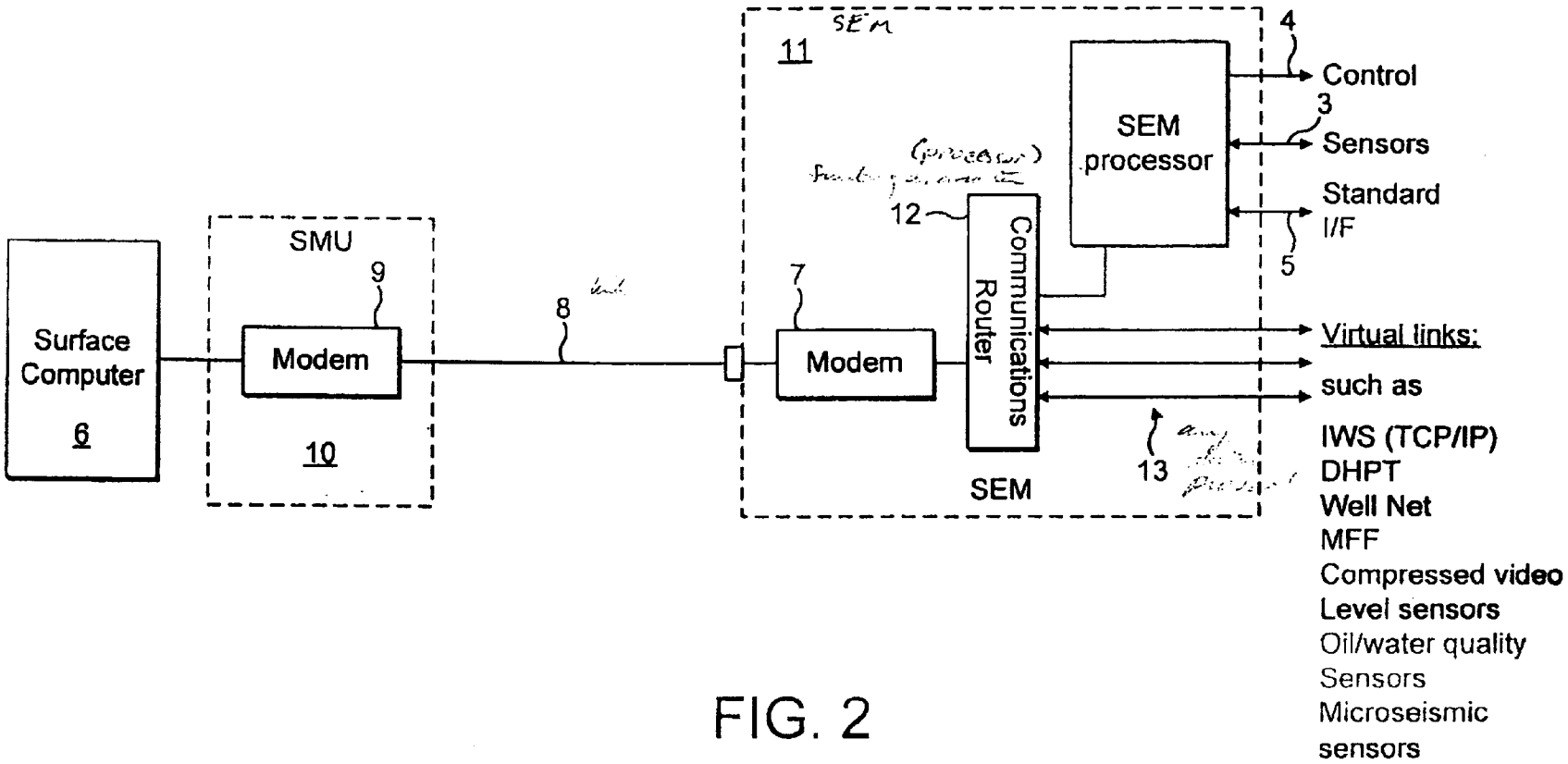
FIG. 2 is a diagram of an example of a system according to the present invention.

FIG. 2 (in which items which correspond with those in FIG. 1 have the same reference numerals as in FIG. 1) illustrates a system according to an example of the invention, showing linking from a surface computer 6 to a well tree. The surface computer 6 at the control centre (on shore or on a platform for example) sends and receives data to and from a surface modem unit (SMU) 10 which houses a modem 9. This modem 9 transmits and receives data via a communication link 8. The other end of the communication link 8 connects to the well head tree which carries a subsea electronics module (SEM) 11 which houses a modem 7 which is a similar device to the modem 9 and performs the opposite function. The modem 7 has an electrical output/input, which is connected to a communications processor 12 which functions as a communications router (or intelligent multiplexer), also housed in the SEM 11. The communications router 12, has a multiplicity of inputs/outputs, there being an interface with a conventional SEM processor 2 (having sensor, control and standard interface ports 3, 4 and 5) and also interfaces 13 which interface with other 'private' standard interfaces known as virtual links. The interfaces are effectively 'star connected' rather than the conventional 'highway connected' and virtually any protocol and data rate can be handled, limited only by the router 12, speed and the final limitation of the bandwidth of the communication link 8 and its modems 7 and 9. Typically, the link 8 could be about 200 km in length, data being transmitted via it at typically 10 Mbits/sec. The software in the router 12 is flexible and handles, by multiplexing, the data and protocol of the 'private' interfaces, as required for the system configuration, to permit high speed communication to and from the modem 7, thereby providing virtual links between the surface and subsea equipment. The SEM processor 2 handles the conventional control of subsea devices, such as valves and chokes, to control the fluid extraction process. It also handles local logging and processing of data from the tree sensors, its main functions being to acquire data from the sensors and assemble it into a format that can be transmitted to the surface computer and to issue control signals to valves and fluid control chokes for example.

Typical of the above-mentioned private, standard interfaces are the intelligent well system interface, (IWS) (an Ethernet interface), and others as shown in FIG. 2 which are well known in the industry, as well as interfaces to devices such as level sensors, microseismic sensors and fluid quality sensors. Due to the fact that the system configuration allows high bandwidth utilisation of the communication link 8, typically a fibre optic link, it is possible to transmit compressed video. This allows the fitting of cameras to the subsea well head, to permit visual inspection of the tree without the need for expensive diving operations or the use of a remote operation vehicle (ROV). This will have major benefits to the well operator who, in the past, has had to rely on sensor information to prompt the deployment of divers or a ROV to effect a visual inspection, but can now have a continuous visual inspection facility.

Figure 3:
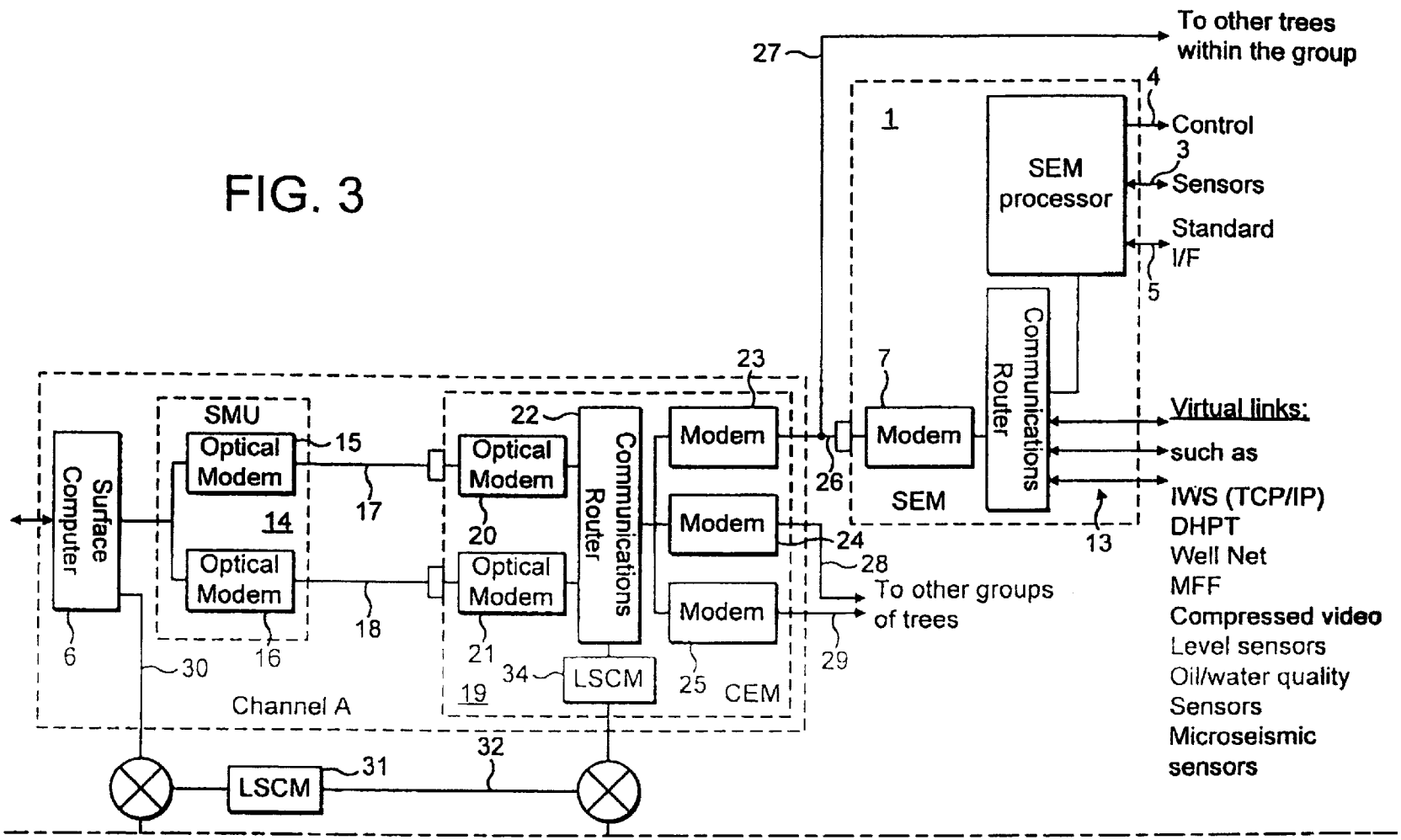
FIG. 3 is a diagram of another example of the present invention.
Figure 3:
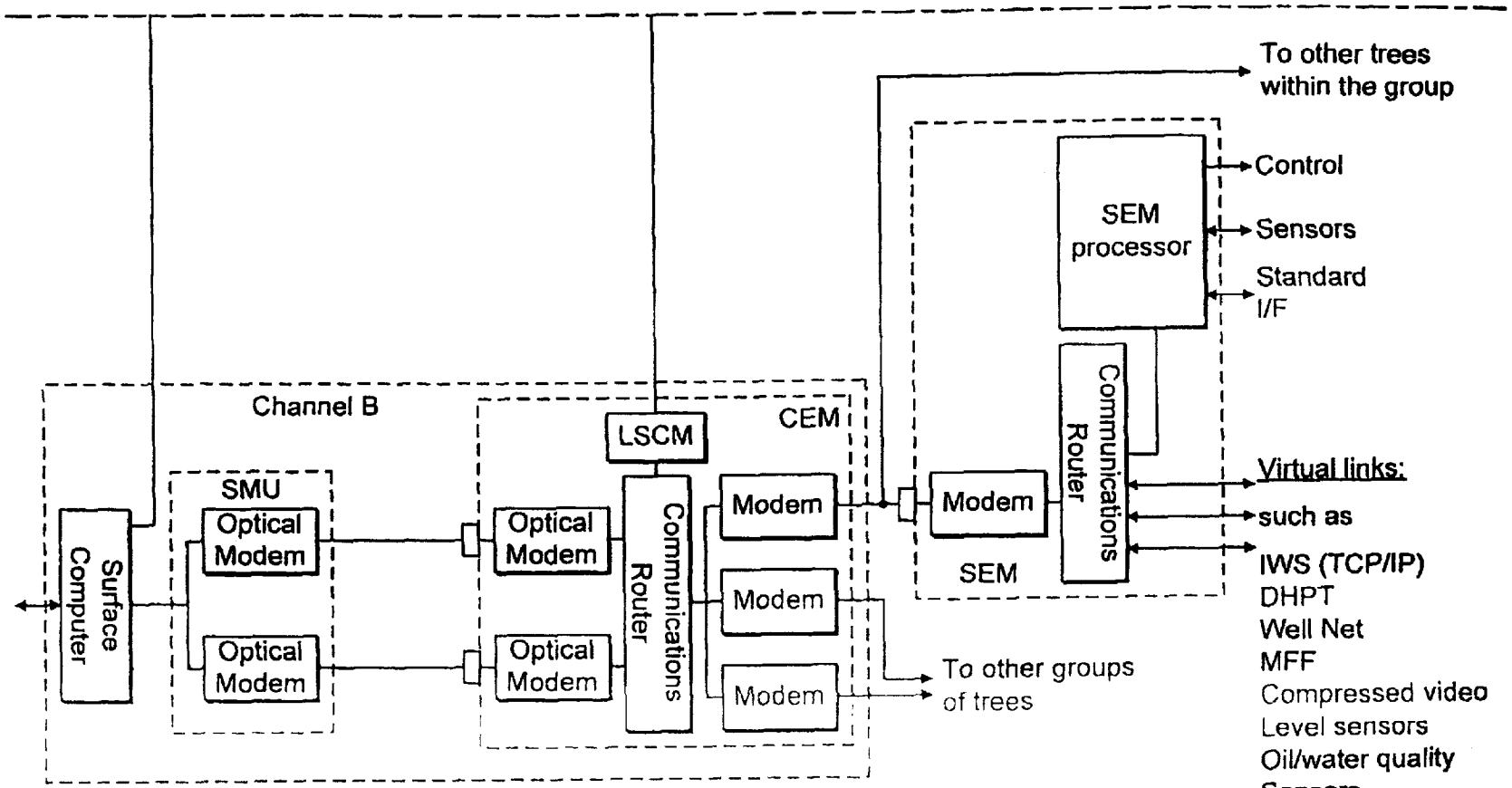

FIG. 3 (in which items which correspond with those in FIG. 2 have the same reference numerals as in FIG. 2) shows a typical full system implementation to handle communication between a control centre and a subsea well complex, and providing high availability through dual duplex redundancy. The figure shows a high end application with a large amount of redundancy and long distance offsets with a subsea central distribution system arrangement that sits between a surface computer and well head control modules.

Two separate communication channels are provided, A and B, to provide 100% redundancy. Describing channel A, a surface computer 6 at the control centre (on shore or on a platform for example) feeds and receives data to and from an SMU 14 which houses two bi-directional optical modems 15 and 16.

The optical modems 15 and 16 interface with respective ones of a pair of optical fibres 17 and 18, which terminate near to a well head complex at a communication electronics module (CEM) 19 typically located on the seabed. Typically, the communication link provided by the optical fibres could be about 200 km, data being transmitted via them at typically 10 Mbits/sec. The CEM 19 enables interfacing of many wells in the locality with the optical fibres 17 and 18. The use of two optical fibres provides further redundancy and thus greater communications reliability. The CEM 19 houses another two bi-directional optical modems 20 and 21 coupled with respective ones of fibres 17 and 18 and which output electrical signals to a communications router 22. The communications router 22 interfaces with electrical modems, of which three, 23, 24 and 25 are shown, by way of example, each of which interfaces with a modem of a SEM at a well tree. Thus, for example, the modem 23 interfaces with a modem 7 of a SEM 1 via a communication link 26 and with the modems at other trees within the group via a communication link 27 and modems 24 and 25 interface with modems at other groups of trees via communication links 28 and 29.

FIG. 3 also shows a duplicated identical channel B for use instead of channel A for further reliability. In the event of failure of both channels, rudimentary communication is provided by a link 30 from the computer 6 of each channel, a low speed communications modem (LSCM) 31, a back-up communication link 32 (typically operating at 1.2 kbits/sec) and a link 33 for each channel, each link being coupled by a LSCM 34 to the communications router 22 of the respective channel.

It should be noted that each of modems 23, 24, 25, etc. and each of the corresponding modems at the well tree SEM's, may, alternatively, be of the form that communicates via the electrical power supply to the tree, i.e. a comms-on-power (COP) type of modem.

Figure 4:
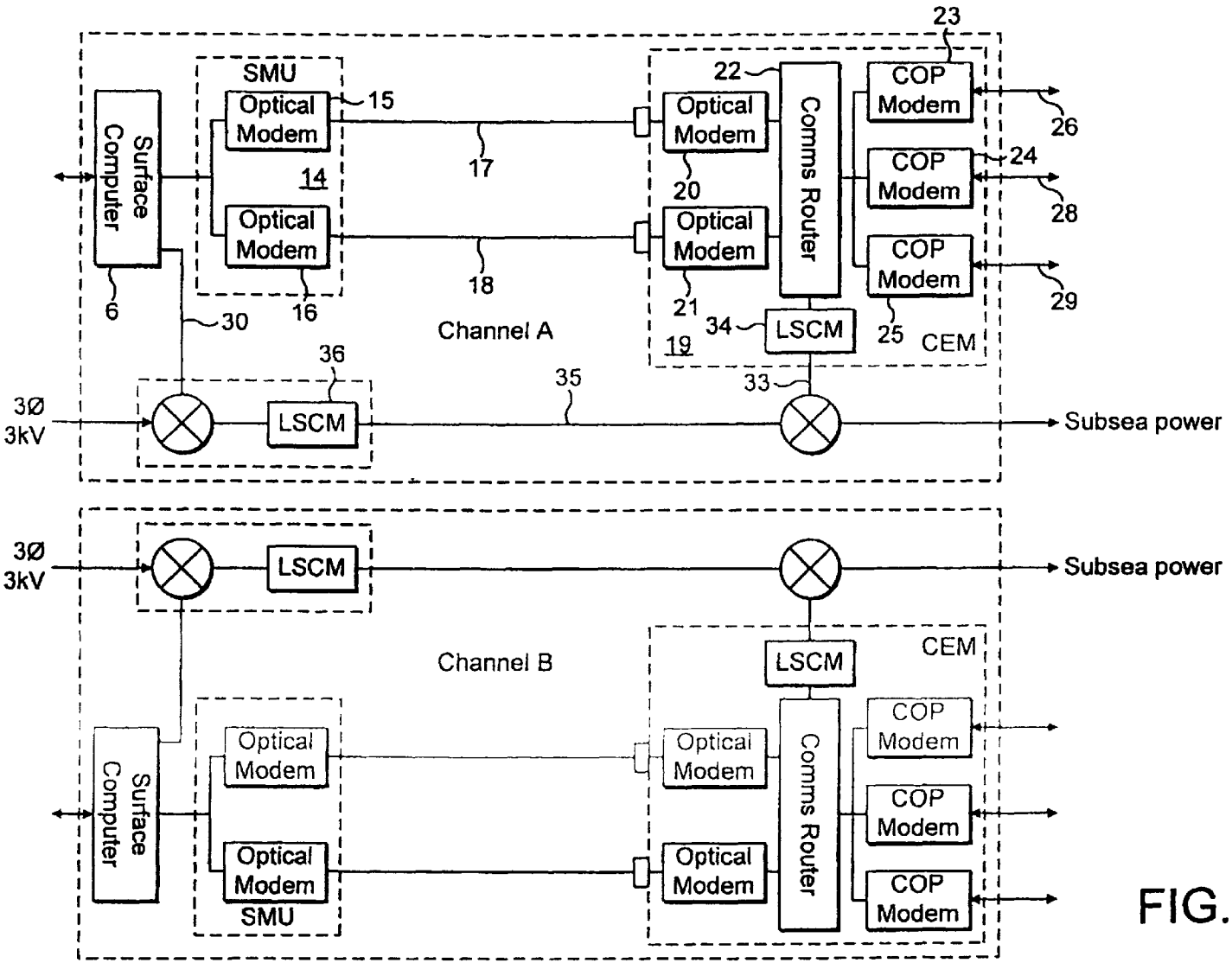
FIG. 4 is a diagram showing part of an alternative to what is shown in FIG. 3.

FIG. 4 shows part of an alternative to the system of FIG. 3, items which correspond with items in FIG. 3 having the same reference numerals as in FIG. 3. Instead of a single back-up communication link, each channel has its own back-up communication link 35 (typically operating at 1.2 kbits/sec), being a link which provides subsea power from a 3-phase, 3 kv supply and each channel having a respective LSCM 36 instead of there being a single LSCM 31 as in FIG. 3. In FIG. 4, modems 23, 24 and 25 are COP modems.

While the invention has been shown in only a few of its forms, it should be apparent to those skilled in the art that it is not so limited but is susceptible to various changes without departing from the scope of the invention.

The invention claimed is:

1. A system for remotely controlling subsea equipment, comprising:

a subsea well complex on a sea floor;

first and second communicating devices at the well complex;

a communications router coupled to the first and second communicating devices;

a computer at a location remote from the well complex;

a communication link extending between the computer and the router; and wherein the router receives signals from the first and second communicating devices and multiplexes the signals onto the communication link.

2. The system according to claim 1, wherein the first communicating device communicates with the router pursuant to a selected data protocol, and the second communicating device communicates with the router pursuant to different data protocol from the selected data protocol.

3. The system according to claim 1, wherein the first communicating device comprises:

a processor that provides signals to electrical devices for controlling valves of the subsea well complex.

4. The system according to claim 1, wherein;

the first communicating device comprises a processor that provides signals to electrical devices for controlling valves of the subsea well complex, the processor communicating with the router with a selected data protocol; and the second communicating device comprises a sensor that monitors a condition associated with the subsea well complex, the second communicating device communicating with the router free of any restrictions as to data protocol.

5. The system according to claim 1, wherein:

the first communicating device comprises a subsea electronics module of a first subsea tree; and the second communicating device comprises a subsea electronics module of a second subsea tree.

6. The system according to claim 1, further comprising:

a communications electronic module located at the subsea well complex, the router being located within the communications electronic module;

a plurality of subsea electronics modules at the subsea well complex, each associated with a separate subsea tree of the subsea well complex; and wherein each of the subsea electronics modules contains a router that communicates with said first mentioned router.

7. The system according to claim 1, wherein:

the router receives multiplexed control signals over the communication link from the computer, the multiplexed control signals including control signals for the first communicating device; and wherein the router directs the control signals to the first communicating device.

8. The system according to claim 1, wherein the communication link comprises a fiber optics link.

9. A system for remotely controlling subsea equipment, comprising:

a subsea well complex having at least one subsea tree containing electrical devices for controlling valves that control fluid flow in the tree and sensors for monitoring tree conditions;

a processor at the well complex for providing signals to the electrical devices and receiving signals from the sensors;

a communicating device at the well complex;

a computer at a location remote from the well complex;

a communications router at the well complex coupled with the processor and the communicating device;

a communication link between the computer and the router, and wherein the router receives signals from the processor and the communicating device and multiplexes the signals onto the communication link.

10. The system according to claim 9, wherein the communicating device communicates with the router at a different protocol and data rate than the processor.

11. The system according to claim 9, wherein the link comprises a fiber optics link.

12. The system according to claim 9, wherein the communicating device comprises a sensor that monitors a condition associated with a well.

13. A system for remotely controlling subsea equipment, comprising:

a subsea well complex having a plurality of subsea trees containing electrical devices for controlling valves that control fluid flow in the trees and sensors for monitoring tree conditions;

a processor associated with each tree for providing signals to the electrical devices and receiving signals from the sensors;

a communicating device associated with each tree that monitors a condition associated with the tree;

a computer at a location remote from the well complex;

a plurality of well tree routers, each associated with one of the trees and coupled to the processor and the communicating device of the same tree, each of the well tree routers communicating with the processor of the same tree by a selected data protocol and communicating with the communicating device of the same tree by at least one other data protocol;

a communication link between the computer and the well tree routers; and wherein each of the well tree routers receives signals from the processor and the communicating device of the same tree and multiplexes the signals onto the communication link.

14. The system according to claim 13, further comprising:

a communications electronic module located at the subsea well complex;

a central router in the communications electronic module and linked to each of the well tree routers; and wherein the communication link extends between the central router and the computer.

15. The system according to claim 14, wherein the communication link comprises a fiber optics link.

*16. A system for remotely controlling subsea equipment, comprising:*

*a subsea well complex;*

*a surface computer facility;*

*at least one communicating device at the well complex;*

*a modem at the well complex for communicating with the computer facility;*

*a communications router at the well complex coupled to the modem;*

*a communications link extending between the computer facility and the modem;*

*a processor at the well complex coupled to the communications router for performing control and monitoring functions at the well complex;*

*the communicating device being coupled directly to the router and by-passing the processor for communicating with the computer facility.*

*17. The system according to claim 16, wherein the communicating device comprises a sensor.*

*18. The system according to claim 17, wherein the sensor comprises a video camera.*

*19. The system according to claim 16, further comprising a sensor coupled to the processor for performing the monitoring function.*

*20. The system according to claim 16, wherein the communicating device communicates with the router pursuant to a selected data protocol, and the processor communicates with the router pursuant to a different data protocol.*

*21. The system according to claim 16, wherein the at least one communicating device comprises first and second communicating devices and wherein the first communicating device communicates with the router pursuant to a selected data protocol, and the second communicating device communicates with the router pursuant to a different data protocol.*

22. The system according to claim 16, wherein the communication link comprises an optical fiber.

23. A subsea electronics module for remotely controlling subsea equipment, comprising:

a subsea modem;

a subsea communications router coupled to the modem;

at least one subsea communicating device coupled to the router;

a subsea processor coupled to the communications router for performing subsea control and monitoring functions;

the communicating device being coupled directly to the router and by-passing the processor.

24. The system according to claim 23, wherein the communicating device comprises a sensor.

25. The system according to claim 24, wherein the sensor comprises a video camera.

26. The system according to claim 23, further comprising a sensor coupled to the processor for performing the monitoring function.

27. The system according to claim 23, wherein the communicating device communicates with the router pursuant to a selected data protocol, and the processor communicates with the router pursuant to a different data protocol.

28. The system according to claim 23, wherein the communicating device comprises a first and a second communicating devices and wherein the first communicating device communicates with the router pursuant to a selected data protocol, and the second communicating device communicates with the router pursuant to a different data protocol.

29. The system according to claim 23, further comprising an optical fiber link connected between the subsea modem and a surface computer facility.

30. A method for remotely controlling subsea equipment at a subsea well complex from a surface computer facility, the method comprising:

(a) providing a surface computer facility;

(b) providing a subsea processor;

(c) providing a subsea communicating device;

(d) providing a communication link between the surface computer facility and the processor and communicating device;

(e) monitoring subsea equipment with the processor and routing a signal in response thereto from the processor to the surface computer facility;

(f) controlling subsea equipment with the processor and routing a signal in response thereto from the surface computer facility to the processor; and (g) routing a signal from the communicating device to the surface computer facility by-passing the subsea processor.

31. The method according to claim 30, wherein step (g) comprises routing a signal corresponding to a sensed parameter.

32. The method according to claim 31, wherein step (g) comprises routing a video signal.

33. The method according to claim 30, wherein steps (e) and (f) are performed using different protocol than step (g).

34. The method according to claim 30, further comprising sensing a subsea characteristic and providing a signal to the processor.

35. The method according to claim 30, wherein steps (e), (f), and (g) are communicated to the surface computer facility via an optical fiber.

36. A system for remotely controlling subsea equipment, comprising:

a subsea well complex on a sea floor;

a processor at the well complex;

at least one communicating device not coupled to the processor at the well complex;

a communications router coupled separately to the processor and the communicating device;

a computer at a location remote from the well complex;

a communication link extending between the computer and the router; and wherein the router receives signals from the processor and the communicating devices and multiplexes the signals onto the communication link.

37. The system according to claim 36, wherein the processor communicates with the router pursuant to a selected data protocol, and the communicating device communicates with the router pursuant to different data protocol from the selected data protocol.

38. The system according to claim 36, wherein the processor provides signals to electrical devices for controlling valves of the subsea well complex.

39. The system according to claim 36, wherein:

the processor provides signals to electrical devices for controlling valves of the subsea well complex, the processor communicating with the router with a selected data protocol; and the communicating device comprises a sensor that monitors a condition associated with the subsea well complex, the communicating device communicating with the router free of any restrictions as to data protocol.

40. The system according to claim 36, wherein:

the processor comprises a subsea electronics module of a first subsea tree.

41. The system according to claim 36, further comprising:

a communications electronic module located at the subsea well complex, the router being located within the communications electronic module;

a plurality of subsea electronics modules at the subsea well complex, each associated with a separate subsea tree of the subsea well complex; and wherein each of the subsea electronics modules contains a router, coupled separately to a processor and a communicating device, that communicates with the first mentioned router.

42. The system according to claim 36, wherein:

the router receives multiplexed control signals over the communication link from the computer, the multiplexed control signals including control signals for the processor; and wherein the router directs the control signals to the processor.

43. The system according to claim 36, wherein the communication link comprises a fiber optics link.

44. A system for remotely controlling subsea equipment, comprising:

a subsea well complex having at least one subsea tree containing electrical devices for controlling valves that control fluid flow in the tree and sensors for monitoring tree conditions;

a processor at the well complex for providing signals to the electrical devices and receiving signals from the sensors;

a communicating device not coupled to the processor at the well complex;

*a computer at a location remote from the well complex;*

*a communications router at the well complex separately coupled with the processor and the communicating device;*

*a communication link between the computer and the router; and*

*wherein the router receives signals from the processor and the communicating device and multiplexes the signals onto the communication link.*

*45. The system according to claim 44, wherein the communicating device communicates with the router at a different protocol and data rate than the processor.*

*46. The system according to claim 44, wherein the link comprises a fiber optics link.*

*47. The system according to claim 44, wherein the communicating device comprises a sensor that monitors a condition associated with a well.*

*48. A system for remotely controlling subsea equipment, comprising:*

*a subsea well complex having a plurality of subsea trees containing electrical devices for controlling valves that control fluid flow in the trees and sensors for monitoring tree conditions;*

*a processor associated with each tree for providing signals to the electrical devices and receiving signals from the sensors;*

*a communicating device not coupled to the processor associated with each tree that monitors a condition associated with the tree;*

*a computer at a location remote from the well complex;*

*a plurality of well tree routers, each associated with one of the trees and separately coupled to the processor and the communicating device of the same tree, each of the well tree routers communicating with the processor of the same tree by a selected data protocol and communicating with the communicating device of the same tree by at least one other data protocol;*

*a communication link between the computer and the well tree routers; and*

*wherein each of the well tree routers receives signals from the processor and the communicating device of the same tree and multiplexes the signals onto the communication link.*

*49. The system according to claim 48, further comprising:*

*a communications electronic module located at the subsea well complex;*

*a central router in the communications electronic module and linked to each of the well tree routers; and wherein*

*the communication link extends between the central router and the computer.*

*50. The system according to claim 49 wherein the communication link comprises a fiber optics link.*

* * * * *